(12) United States Patent
Karapetyan

(10) Patent No.: US 7,334,539 B1
(45) Date of Patent: Feb. 26, 2008

(54) PARROT DECORATIVE TOWER

(76) Inventor: Armen Karapetyan, 1935 N. Van Ness Ave., Los Angeles, CA (US) 90068

( * ) Notice: Subject to any disclaimer, the term of this patent is extended or adjusted under 35 U.S.C. 154(b) by 76 days.

(21) Appl. No.: 11/076,122

(22) Filed: Mar. 9, 2005

(51) Int. Cl.
*A01K 31/12* (2006.01)

(52) U.S. Cl. .................... 119/537; 119/468; 119/705

(58) Field of Classification Search ............ 119/537, 119/531, 28.5, 707, 705, 708
See application file for complete search history.

(56) References Cited

U.S. PATENT DOCUMENTS

| | | | | |
|---|---|---|---|---|
| 819,204 | A * | 5/1906 | Buckingham | 119/531 |
| 1,080,767 | A * | 12/1913 | Mann | 223/96 |
| D76,406 | S * | 9/1928 | Leon | D30/199 |
| D175,292 | S * | 8/1955 | Austgen | D30/160 |
| 3,678,901 | A * | 7/1972 | Dulle | 119/537 |
| 4,627,384 | A * | 12/1986 | Courteau | 119/537 |
| 5,002,012 | A * | 3/1991 | Pierrot | 119/28.5 |
| 5,022,345 | A * | 6/1991 | Bolivar et al. | 119/708 |
| 5,022,349 | A * | 6/1991 | Bryant et al. | 119/57.8 |
| 5,099,796 | A | 3/1992 | Morgan | |
| 5,218,927 | A * | 6/1993 | Addams | 119/537 |
| 5,275,126 | A | 1/1994 | Peterson | |
| 5,381,758 | A * | 1/1995 | Simon | 119/537 |
| 5,819,689 | A | 10/1998 | Simon | |
| 5,996,536 | A * | 12/1999 | King | 119/459 |
| 6,129,052 | A * | 10/2000 | Huang | 119/461 |
| 6,360,693 | B1 * | 3/2002 | Long, III | 119/707 |
| 6,463,884 | B1 * | 10/2002 | Lien | 119/537 |
| 6,736,088 | B1 * | 5/2004 | McGregor et al. | 119/708 |
| 6,971,332 | B2 * | 12/2005 | Woltmann et al. | 119/467 |

FOREIGN PATENT DOCUMENTS

FR 2586584 A1 * 3/1987

* cited by examiner

*Primary Examiner*—T. Nguyen

(57) ABSTRACT

An improved parrot decorative tower provides higher possibility and convenience to expose the beauty of the exotic birds keeping birds safety and living space sanitary conditions. An improved parrot decorative tower includes a mobile portion and an attachable portion (a decorative portion). The mobile portion comprises a container with an open upper side, removable tray installed at the lower portion of the container, at least on of a plurality of wheels/rollers and a connecting device including a fixing portion comprising at least one of a plurality of brackets and tightening bolts. The decorative portion is coupled with the mobile portion by an appropriate quantity of the directors rigidly connected to the frame coupled with the perch and comprising an exotic landscape picture or mirror installed in the frame.

1 Claim, 3 Drawing Sheets

PARROT DECORATIVE TOWER

FIELD OF THE INVENTION

This invention relates to the avian perch and, more particularly, to the parrot decorative, mobile, pleasurable view tower, providing easy disassembling, and sanitary easily cleaned and sterilized living environment.

BACKGROUND OF THE INVENTION

Presently, more people have kept the rare and exotic birds. Typically, the cages involve open lattice work such as wire, wood or, in this day and age, plastic. Perch systems have historically been in the form of pieces of tree branch, dowel sticks or other rods crossing a portion of the cage in a horizontal fashion. Other perches have taken the form of wire and wood or plastic trapeze type swings. The difficulty with the prior art perches is that they are generally only horizontal, that they are rigid and that they are of a single "feel", and that they cause certain types of rigidity in the musculation of the birds to set in, particularly in birds that perch hour after hour and day after day on the same horizontal wooden dowel of the same diameter.

There are known a lot of types of the cages in prior art, which allow some dynamically active caged birds to change location or angle inside the cage.

For example, the kinetic perch system by U.S. Pat. No. 5,099,796 describes the cage involving a kinetic perch system for birds. The cage includes a plurality of flexible rope sections with each section having a first end and a second end, with at least two of these rope sections having at least one knot therein located between the first end and the second end. Joining mechanisms are also included for joining the first ends of the flexible rope sections to one another. The joining mechanisms may actually be the ends of the ropes tied together, or may be a toroid or other device for joining the first ends of the plurality of flexible rope sections. Also included are separate connecting mechanisms located a each of the second ends of the plurality of flexible rope sections for connecting each of these second ends to different locations of a cage. The flexible rope may be a woven cord, a link chain or any other material which may be natural or synthetic. In another embodiment, the kinetic perch system includes a cage which has at least two wall portions with an open lattice structure and contained therein is the aforementioned plurality of flexible rope sections joined to one another at their first ends and connected to the cage itself at their second ends by the mentioned connecting mechanisms. Additionally, the cage can include at least two wall portions of open lattice structure and at least one multiple perch-creating flexible rope. The rope has a first end and a second end with separate connecting mechanisms on each end and the flexible rope is connected at one end to a first location of the cage and is then woven in a back and forth manner to create a plurality of perch sections within the cage and, finally, the second end with the connecting mechanism is attached to yet a different location within the cage. In this as well as all of the present invention kinetic perch systems, the flexible rope may be removed and reattached in different locations for the purpose of cleaning and/or relocating the perch sections for a change of the environment for the bird. Generally, this cage comprises a plurality of flexible rope sections constituting different perch sections. These ropes sections have the first ends and the second ends. Knots are located between the respective first and second ends of each rope section. Connecting mechanisms are either clip-on or cut 0-ring type connectors. Further, the first ends are joined together by joining mechanisms, which constitutes the tieing or interweaving of the first ends to one another. The present kinetic perch system can be attached to the lattice work of a cage so that the various rope sections are tense or loose and may all be connected at the same height or at different heights to create various angles of perch sections. The connectors are not permanent but enable the system to be removably connected so that the various sections or the entire system maybe removed or relocated as desired. Also, the first ends are joined together by being each separately tied to a toroidal ring which may be plastic, wood or other material such as metal or ceramic, and the use of the toroid enables the user to branch the various rope sections off at any angles desired relative to one another while maintaining the toroid at the center of the perch sections. Commonly, the cage includes bottom section and open lattice work with corner vertical wires. The connecting mechanisms can be connected to the ends of the corner wires or any wiring within the cage.

This system is not mobile and includes the traditional wired style cage without any expression of the pleasurable aspects of the exotic birds.

Such common bird cages containing the traditional water dish and a food bowl into the cage are mostly intended for the small bird, e.g. a finch, parakeet, canary, etc. However, in order to comfortably accommodate a larger bird, a cage has to be extremely large and cumbersome.

Further, these cages are normally made of steel or other metals. These surfaces can, under certain circumstances, induce illness in the birds living therein and therearound. Additionally, cleaning a perch that is seated inside a cage can be a time consuming task.

In order to avoid the traditional cage style, owners of pet birds, such as parrots, try to provide various types of perches, external to a cage, mostly for indoor use and by the exotic birds.

It is well known, that perching birds mostly utilize surfaces which are more horizontal on which birds can most of the time stand or walk. It is also known, that a tree (e.g. such as the manzanita tree, which grows at high elevations in Arizona and California, provides materials which are especially and mostly suitable for the parrot's use), placed in the conventional position with the trunk being vertical, and having horizontal attached branches sufficiently long to satisfy the needs of the perching bird would be much too large to fit inside a person's home. Another disadvantage of standing trees used as perches is that many domestic birds whose wings are clipped will climb down the trunk to the floor. A bird that has climbed down may be in serious danger of being stepped upon, of chewing on an electric cord, of being attacked by another household pet, or of doing damage to furniture or other possessions of the owner. Thus, all domestic birds on conventional open perches must be supervised at all times. Another known common problem faced by the owners of domestic birds is the conventional cups used to feed the birds. Typical feeding and watering cups, generally made of stainless steel or other metals with a lead free power coat finish, or of a hard plastic coating, are provided with internally threaded bosses descending centrally from their lower surfaces to engage externally threaded bolts.

To avoid such deficiency, in the hanging bird perch by U.S. Pat. No. 5,275,126 the cup (feeding dish) connected to the suspended tree by a quick mechanism. The hanging perch by the mentioned above patent also includes a tree attached to an overhanging structure by means of a straight chain assembly and a bifurcated chain assembly. The overhanging structures for this purpose include the ceiling of a building, brackets extending inward from a wall of a building, or a framework extending over the perch and downward to the floor. The tree is an essentially a whole, or large portion of a manzanita tree, except for roots and leaves, which is suspended in a generally horizontal orientation. The perch also includes one or more feeding cups removably attached to a branch of tree. Generally, at least two cups are utilized, one for food and the other for water. Straight chain assembly has a disk shaped baffle attached thereto to prevent a bird using the perch from climbing upward to the ceiling. The straight chain assembly is fastened to tree by means of a clasp attached between chain and an attachment ring screwed or bolted into tree. Bifurcated chain assembly includes an upper chain and a pair of lower chains, centrally fastened by another clasp. Lower chains are in turn fastened to attachment rings by means of clasps. Another disk shaped baffle is mounted on upper chain, similarly to prevent the bird from climbing beyond that baffle. The uppermost links of chain and upper chain are in turn fastened to an overextending support structure, such as a ceiling, by means of hooks extending downward therefrom. As long as the center of gravity of tree, together with whatever devices are attached thereto and the bird standing at various locations thereon, lies within triangle formed by the three attachment rings, tension is maintained in all of the chains, so that rotation about the general horizontal axis of tree is prevented. If the two chain assemblies are attached to the ceiling in a spaced apart relationship, no vertical axis rotation of perch is permitted. However, perch can rotate about an axis parallel to the ceiling and thereby incur a gentle swinging effect. In order to minimize rotation about the axis of perch and about the vertical axis between the ceiling and perch, and further in order to permit a gentle swing of perch, it is desirable that the attachment of the three rings to tree be spread apart as far as practical. Each clasp has a slot which is opened to permit the passage of an end of a chain link or an attachment ring and thereafter closed without any spaces in which the bird can become caught. Slot may closed using nut such that by turning a nut as it engages screw threads, nut will extend completely across the slot. An external surface of nut includes knurling or facets in a hexagonal shape to facilitate turning nut on threads. Slots in the various chains are avoided by using chain links having a welded closed loop construction, instead of links which are simply press formed into shape. Each disk shaped baffle is supported on a chain by an ball, which is made of a elastomeric foam material, having a diametral hole extending therethrough to accept the chain. Hole is sized so that the elastomeric properties of ball maintain sufficient pressure on the links of chain extending therethrough to hold ball and baffle in place on chain, while, at the same time, allowing the height adjustment of ball on the chain. Each baffle 17 is secured to the top of ball by the action of gravity on baffle. A central hole in baffle is sized to allow the angular tipping of baffle when a downward force is applied, for example, near the outer periphery of baffle. Thus, each baffle is easily tipped whenever a bird attempts to climb on it from below, placing, for example, a beak or claw on an edge of baffle. The cup is removably attached by means of the engagement of an attachment pin assembly with an attachment coupling. Generally, the attachment coupling is, in turn, fastened to branch by means of a wing nut engaging an externally threaded shaft, which descends through a clearance hole in branch from attachment coupling. The attachment pin assembly descends from a lower surface of cup by an externally threaded portion of a pin engaging an internally threaded portion of a flanged collar welded to the bottom of cup, and the pin narrows and extends downward from the threaded portion, thereby forming a ledge. The compression spring is held against ledge by a transverse pin pressed through a hole near the lower tip of central pin.

This perch is the complex, expensive and inconvenient, because is permanently connected to the ceiling (not mobile), and does not provide convenient sanitary cleaning and sterilizing the hanging perch and/or living space under such perch.

Another bird's perches are described in the U.S. Pat. Nos. 5,381,758 and 5,819,689. The disclosed perches (bird/parrot towers) generally include a base, comprising a stand and a tray. The stand comprises four legs. Each leg is releasably attached to a joint. Each of the joints has a pair of substantially horizontally aligned legs set at right angles to each other. An identical wheel or roller is attached at the bottom of each joint. The tray is mounted atop each of the legs. The tray is mounted atop each leg via removable means for mounting such as screws. The tray includes a centrally located downwardly directed recess into which the center column is seated. The tray is provided to catch any food particles spilled by the bird as it eats. Additionally, the tray serves to catch any waste materials excreted by the bird while perched on the tower.

The device also comprises the center column formed from a plurality of column portions or collars. The column portion has a body that is substantially cylindrical and hollow in its configuration having diameter greater than that of the post, and including a top or first edge, a second or bottom edge, an annular first shoulder interiorly disposed the body recessed from the first edge, the first shoulder having a plurality of notches formed therein. The column portion additionally includes a second annular shoulder downwardly extending from the second edge. The second shoulder has an outer diameter that is slightly less than the inner diameter of the body to allow the second shoulder to be slidably received within the body. Also, the second shoulder has at least one detent extending from the second shoulder seats in one of the plurality of notches in the first shoulder of an adjoining one of the plurality of column portions.

This perch does not provide pleasurable view and convenient sanitary conditions, considering the "open" tray with the wasted materials excreted by the bird.

Thus, there is a great need in the art for the improved conveniently mobile, not complex, not expensive and pleasurable view parrot decorative tower, providing easy disassembling, and sanitary easily cleaned and sterilized living environment.

OBJECT AND ADVANTAGES OF THE INVENTION

Accordingly, several objects and advantages of the present invention are to provide convenient, mobile, not complex, not expensive and pleasurable view parrot decorative tower, providing easy disassembling, and sanitary easily cleaned and sterilized living environment.

It is another object of the invention to provide pleasurable panoramic view of the exotic bird(s).

It is still another object of the invention to provide easier care and cleaning of the wasted materials excreted by the bird.

It is further object of the invention to provide the maximum owner's approachability to the parrot(s).

It is still further object of the invention to provide possibility of the different lightening effect(s) of the exotic bird panoramic view (e.g. by the attached lamp(s)).

Still, further objects and advantages will become apparent from a consideration of the ensuing description accompanying drawings.

DESCRIPTION OF THE DRAWING

In order that the invention and the manner in which it is to be performed may be more clearly understood, embodiments thereof will be described by way of example with reference to the attached drawings, of which.

SUMMARY OF THE INVENTION

Most known parrot tower/cages do not provide pleasurable view of the exotic birds and esthetical sanitary conditions.

Thus, there is a great need in the art for the improved conveniently mobile, not complex, not expensive and pleasurable view parrot decorative tower, providing easy disassembling, and sanitary easily cleaned and sterilized living environment.

An improved parrot decorative tower provides higher possibility and convenience to expose the beauty of the exotic birds keeping birds safety and sanitary conditions.

An improved parrot decorative tower includes a mobile portion and an attachable portion (a decorative portion). The mobile portion comprises a cubic or rectangular form container with an open upper side, removable tray installed at the lower portion of the container and providing the placement of the feeding plate(s)/cup(s), drinking cup(s), and to catch any food particles spilled by the bird as it eats and any waste materials excreted by the bird while perched on the tower. The mobile portion also includes at least on of a plurality of wheels/rollers and a connecting means including a fixing means comprising at least one of a plurality of brackets and tightening means. The decorative portion is coupled with the mobile portion by an appropriate quantity of the directors rigidly connected to the frame coupled with the perch and comprising an exotic landscape picture or mirror.

DESCRIPTION OF THE PREFERRED EMBODIMENTS

Herein the description of an improved parrot decorative tower will be done in statics (as if the components of the improved device are suspended in the space) with the description of their relative coupling to each other. The description of the functional operations of the improved parrot decorative tower will be done hereinafter.

Figure 1:
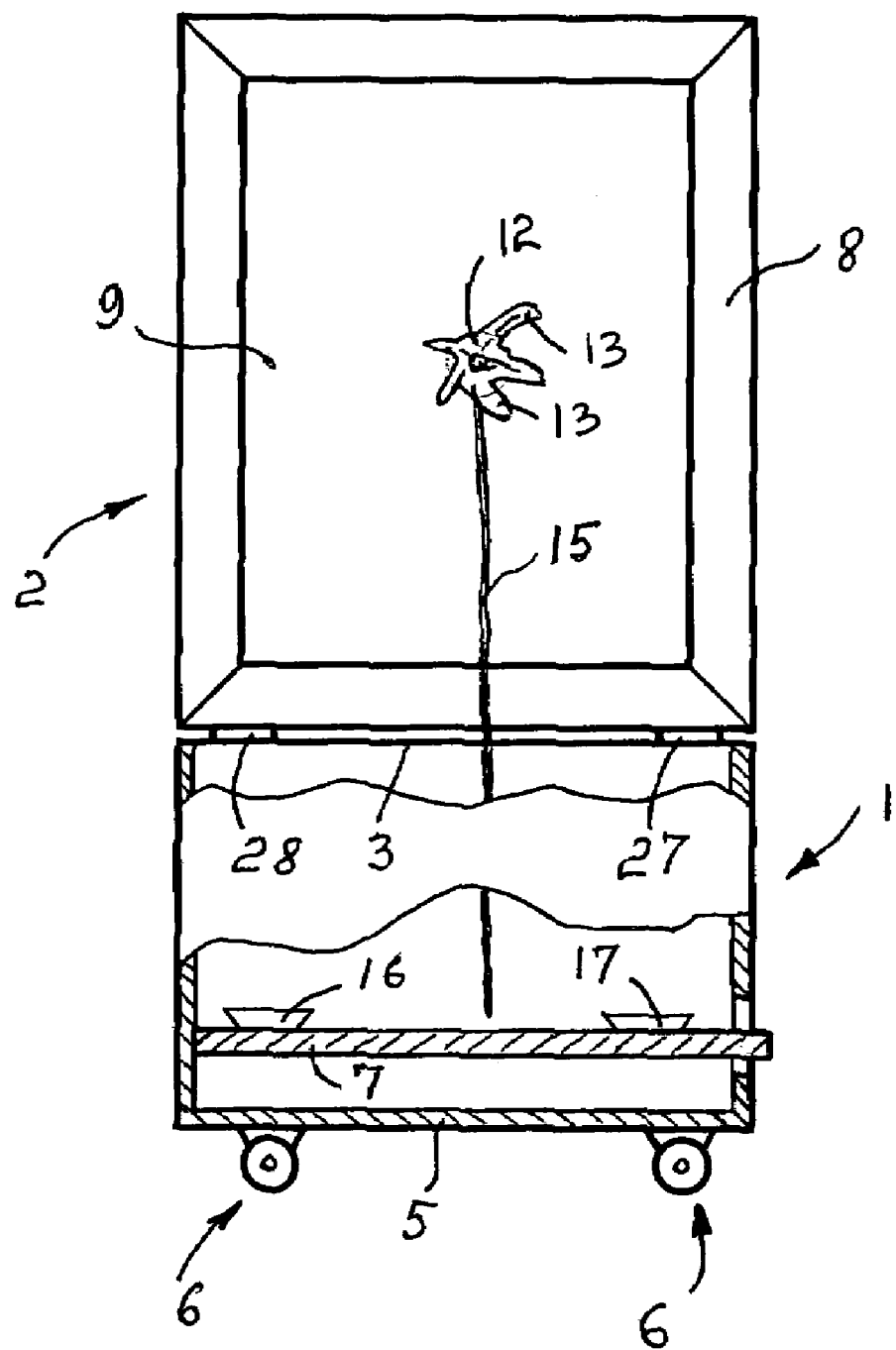
FIG. 1 is a simplified front view of the improved parrot decorative tower.

An improved parrot decorative tower, referring to FIG. 1, includes a mobile portion (a cage-cart) 1 and a decorative portion (an attachable portion) 2. The mobile portion 1 comprises an open upper side 3 of the container (box) 4 of, for example, cubic or rectangular form, etc. The lower side 5 of the container 4 is coupled with at least one of a plurality of wheels (or rollers) assembly 6. The single wheel assembly 6 can be housed, for instance, in the front or approximately middle of the lower side 5 (not shown), and the lower side 5 can include the rests (not shown) providing the stable position of the perch on the, for example, floor, etc. The FIG. 1 illustrates the presence of four wheel assemblies 6 connected to the lower side 5 of the container 4, as a simplified example of the possible wheel housing, and does not limit any other possible combinations of the wheel (rollers) and wheel/roller assemblies 6 housing principle, e.g. to house three wheel (not shown) on the lower side 5 of the container 4, etc. The container 4 can include the open lower side 5 (not shown), and the removable tray 7 can be installed instead of the container's side 5. Also, the container 5 can include the lower side 5 and a removable tray 7. The tray 7 provides the placement of the feeding plate(s)/cup(s) 16, drinking cup(s) 17, and to catch any food particles spilled by the bird as it eats. Additionally, the tray serves to catch any waste materials excreted by the bird while perched on the tower.

There is known common problem faced by the owners of the parrots is the conventional cups used to feed the parrots. Typical feeding and watering cups, generally made of stainless steel or other metals with a lead free power coat finish, or of a hard plastic coating, are provided with internally threaded bosses descending centrally from their lower surfaces to engage externally threaded bolts. Such bolts may be, in turn, used to fasten the cups, for example, to perches inside cages or on an external perch. A food or water cup should be removed every day for refilling and additionally for cleaning in order to prevent serious illnesses of the bird due to bacteria. The feeding and watering cups are removed and re-attached by unscrewing or screwing the boss into or from the threaded bolt. One problem with the attachment of cups by the conventional method is the time required for removal and re-attachment by screwing the cup off and on. This problem is particularly serious because some birds can be especially territorial concerning their food cup; many birds, even when tame, repeatedly peck any hand being used to remove this device. Another problem is that some bird have the capability of unscrewing a conventional cup unless it is tightly secured, thereby causing unnecessary spillage. A tightly secured cup, in turn, increases the time and difficulty to remove the cup, thereby permitting the bird additional time to peck at the owner. Considering all mentioned problems, the lower side 5 or tray 7 can include the recesses (not shown) for the plates/cups 16 and 17 in order to eliminate possible displacement of the cups by birds.

Figure 2:
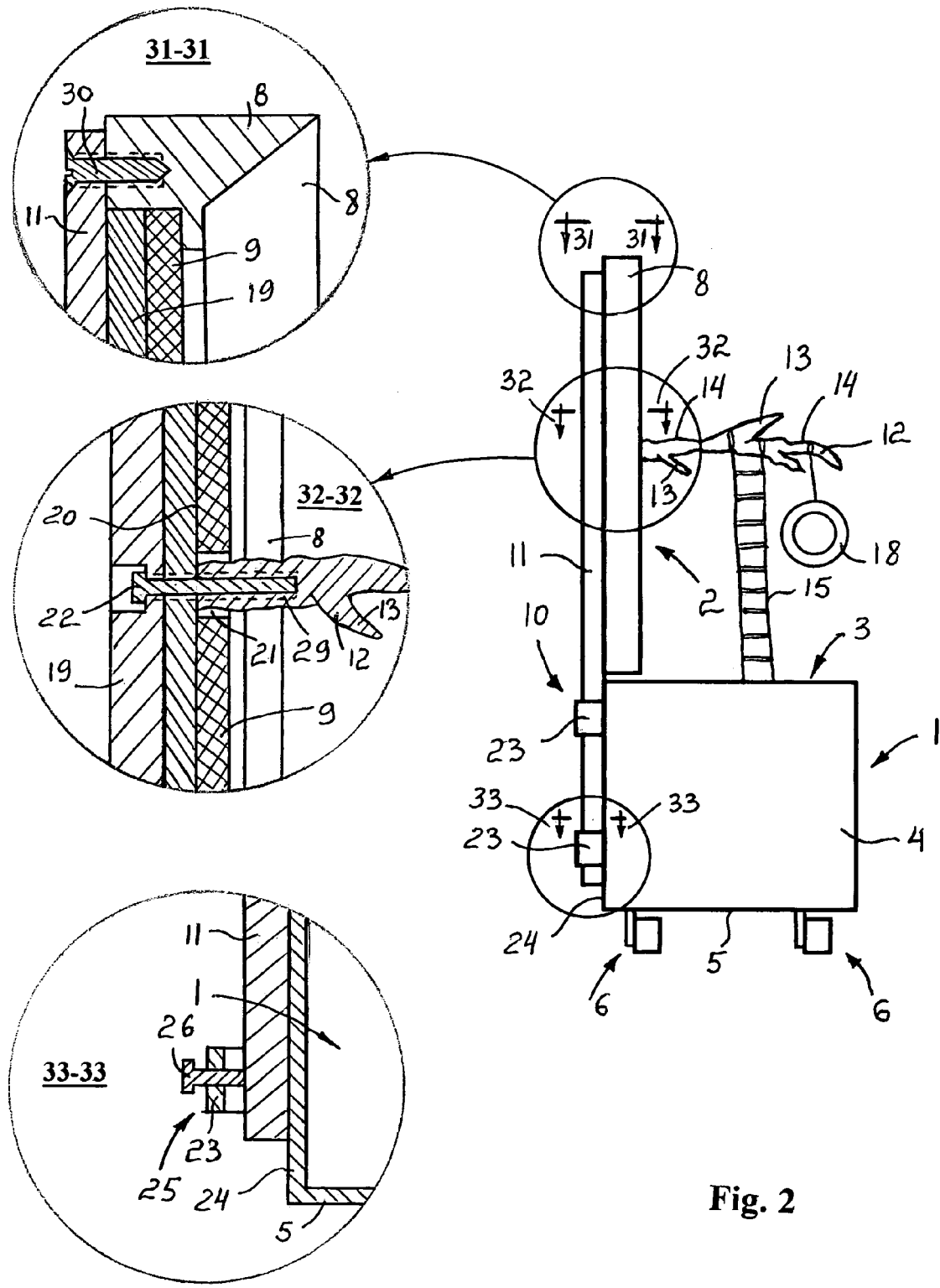
FIG. 2 is a simplified side view of the improved parrot decorative tower.
Figure 3:
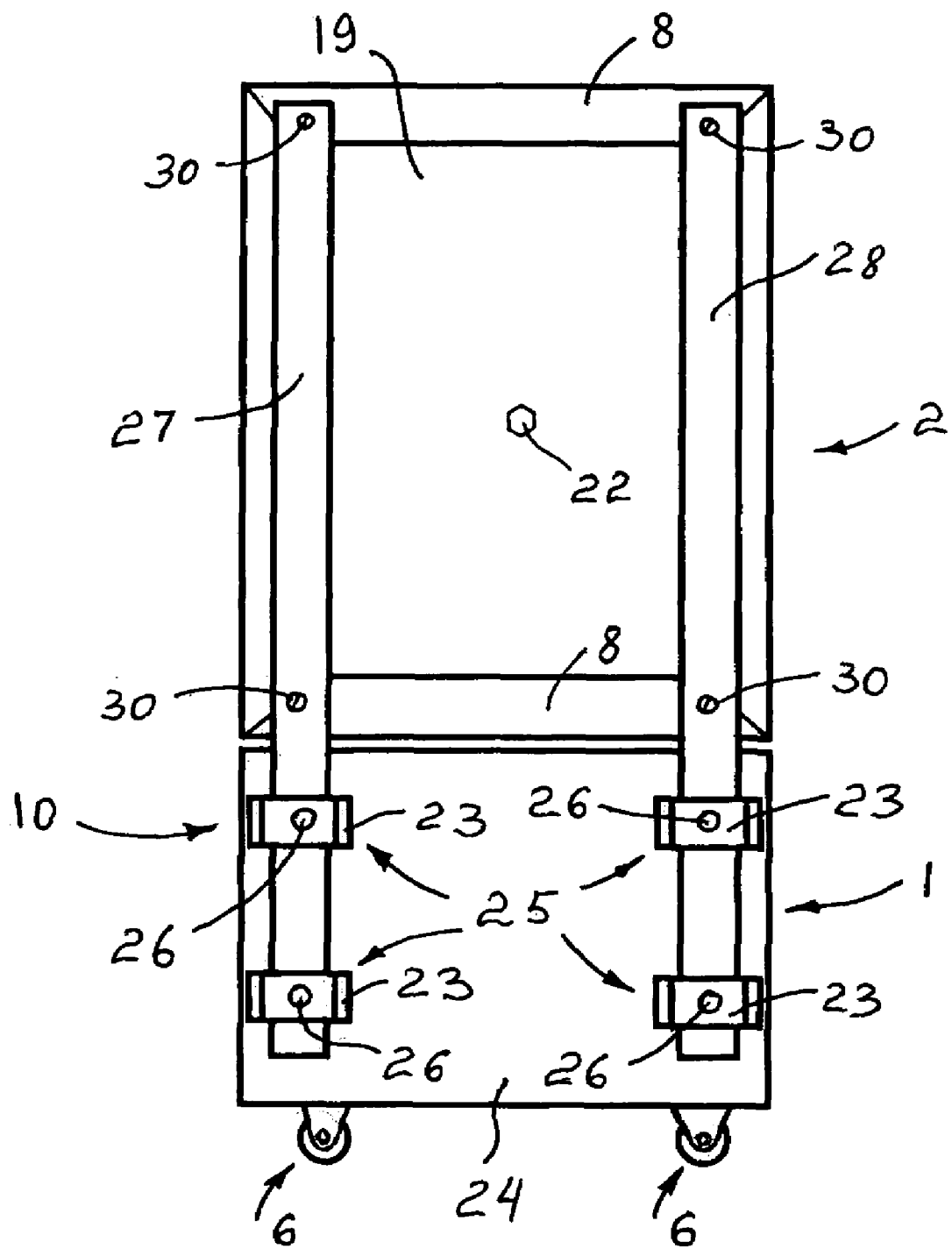
FIG. 3 is a simplified back view of the improved parrot decorative tower.

The container 5 can be made of any material including preferably non-breakable transparent materials, such as thick glass (e.g. with some painted floral pattern on the glass, etc.), or can be a regular cage with the openable upper side, etc. The decorative portion 2 comprises the frame 8 (e.g. such as picture or mirror frames, etc.), picture (e.g. exotic landscape photopicture, painting or mirror, etc.) 9, connecting means 10 (see FIGS. 2, 3), including at least one of a plurality of directors 11 rigidly (e.g. by screw(s) 30) connected to the frame 8 (in FIG. 3 are conventionally/conditionally shown two directors: the first director 27 and second director 28, but connecting means 10 can include, for example, a single director 11 (see FIG. 2) located in the center of the frame 8, etc.). For example, assume further, that the picture 9 with an exotic landscape on it is installed in the frame 8. As it is shown in FIGS. 1, 2, the perch 12 is attached to the picture 9. The connection of the perch 12 to the picture 9 can be provided by any reliable principles and means (e.g. glue, hardware such as bolts, etc). For this connection the picture 9 has to be of a significant thickness, or the frame 8 can include the cover 19 housed at the picture's back side 20. The picture 9 includes an aperture 21 for connection of perch 12 to the cover 19, for instance, by an externally threaded bolt 22 coupled with the internally threaded aperture 29 into perch 12 freely passing through the aperture 21, as shown in FIG. 2.

The perches should preferably imitate a natural setting for the parrot, to the extent possible, and may be fabricated from nontoxic natural and nontoxic artificial materials, with hardwood trees being quite popular in the modern time.

The manzanita tree species is mostly recommended for use because it offers an aesthetically attractive surface, which is durable enough to resist destruction by the repeated pecking of a large parrot, and is small enough to fit within a reasonable amount of space which can be allocated to a parrot in the tower. Further, manzanita tree surface provides an appropriate texture and deformities to allow a large parrot to stand in place for a long time without tiring that would have to be the muscles used to hold onto rounded smooth surfaces with its feet and claws. Other materials, including artificial materials, such as plastic, etc. and other hardwood trees, may also be used to the extent the above criteria is met.

Since parrots are particularly adapted for perching on, and walking along, essentially horizontal tree limbs, it is particularly desirable that substantial, contiguous portions of the perch 12 and its major branches 13 are essentially horizontal. While parrots may be able to climb upward or downward on generally vertical surfaces having suitable textures, they can only be at rest on nearly horizontal surfaces, for example, such as horizontal surface 14, shown in FIG. 2. Thus, pieces of some trees may not be suitable for use as perch 12, because of excessive dips or rises in the trunk and major branch portions, or because their major branches are perpendicular to one another or not spread adequately. In some instances, parrot's owner may modify the perch to provide more suitable structures, for example, by removing inappropriate branches or adding or repositioning a major branch to increase the spread of such branches. Also, the pieces of most trees may be used for the perch, as well as a non-toxic plastic imitation of them.

It is understood that the features of the present invention are particularly desirable if they are considered in view of certain inherent characteristics of exotic birds, such as parrots. Also, it is commonly known, that parrots generally want to stay in high places, where they are relatively safe.

As it was mentioned above, the parrots can climb upward or downward on generally vertical surfaces having suitable textures, therefore the vertical ladder 15 can be attached to the perch 12, as it is illustrated in FIGS. 1, 2. The ladder 15 provides for parrot possibilities to excess the feeding 16 and drinking 17 cups into the container 4, and of parrot's excesses. Additional amusement accessories, such as ring(s) 18, etc. can be attached to the perch 12. The ladder 15 can be made of any reasonable, reliable and non-toxic material, for instance, such as rope, wood pieces, etc.

The container/box 4 also includes the appropriate quantity of brackets 23. The quantity of the brackets 23 is depended on quantity of the directors 11 (in FIG. 3 are conditionally/conventionally shown two directors 11).

The example of coupling of the attachable portion 2 to the mobile portion 1 can be provided as following. Referring to FIGS. 2, 3, the brackets 23 are rigidly connected to the back (rear) side 24 of the container 4. Each bracket comprises a fixing means 25, which can be presented, for instance, by a tightening means 26, providing the reliable connection of the appropriate director to the mobile portion 1.

The decorative portion 2, for example, can be directly connected wall (not shown), and the mobile portion 1 can be just positioned under that decorative portion without any connection to it.

Thus, the described invention presents the improved conveniently mobile, not complex, not expensive and pleasurable view parrot decorative tower, providing easy disassembling, and sanitary easily cleaned and sterilized living environment.

It should be understood that numerous modifications and variations of the present invention are possible in light of the above teachings and it is also understood that the above description discloses specific embodiments of the present invention and are for purposes of illustration only without any limitations. There may be other modifications and changes obvious to those of ordinary skill in the art which fall within the scope of the present invention and within scope of the appended claims, the invention may be practiced otherwise than as specifically described herein.

CONCLUSION, RAMIFICATION AND SCOPE

Accordingly the reader will see that, according to the invention, I have provided the improved parrot decorative tower. The improved parrot decorative tower has various possibilities, considering activities of the exotic birds, e.g. such as parrots providing easy disassembling, and sanitary easily cleaned and sterilized living environment.

While the above description contains many specificities, these should be not construed as limitations on the scope of the invention, but as exemplification of the presently-preferred embodiments thereof. Many other ramifications are possible within the teaching to the invention. For example, the improved parrot decorative tower can be successfully used during the exotic birds show(s) and in the pet stores, etc.

Thus, the scope of the invention should be determined by the appended claims and their legal equivalents, and not by examples given.

THE DRAWING REFERENCE NUMERALS

1.—a mobile portion;
2.—an attachable portion;
3.—an upper side of the container;
4.—a container/box;
5.—a lower side of the container;
6.—a wheel/roller assembly;
7.—a tray;
8.—a frame;
9.—a picture;
10.—a connecting means;
11.—a director;
12.—a perch;
13.—a branch;
14.—a horizontal surface;
15.—a ladder;
16.—a feeding cup;
17.—a drinking cup;
18.—a ring;
19.—a cover;
20.—a back side of the picture 9;
21.—an aperture;
22.—an externally threaded bolt;
23.—a bracket;
24.—a back side of the container 4;
25.—a fixing means;

26.—a tightening means;
27.—a first director;
28.—a second director;
29.—an internally threaded aperture;
30.—a screw;
31-31—a cross-sectional view;
32-32—a cross-sectional view;
33-33—a cross-sectional view.

What is claimed is:

1. An improved parrot decorative tower, providing an open space for an exotic bird, comprising
   a connecting means including
      at least one of a plurality of directors;
      at least one of a plurality of fixing means including
         at least one of a plurality of brackets, and
         at least one of a plurality of tightening means;
   a mobile portion including
      a container with an open upper side;
      a removable tray installed at the lower portion of the container;
      at least on of a plurality of wheel assemblies connected to a bottom of said container, and wherein said at least one of said plurality of said brackets is connected to a back side of said container;
   a vertically located decorative portion of said parrot decorative tower, comprising
      a picture or a mirror installed in a frame;
      a cover installed in said frame behind said picture or said mirror, wherein said at least one of said plurality of said directors of said connecting means is rigidly connected to said frame, and wherein said at least one of said plurality of said directors unobstructedly vertically passes through said at least one of said plurality of said brackets and tightened to said at least one of said plurality of said brackets by said at least one of said plurality of said tightening means;
      a first aperture located in said cover;
      a second aperture adequately located in said picture or said mirror;
      a perch horizontally located at front of said picture or said mirror and including an internally threaded aperture;
      an externally threaded bolt, horizontally passing through said first aperture and said second aperture, is coupled with said internally threaded aperture of said perch tightening said perch to said picture or said mirror;
      an amusement accessories attachment to said perch, and wherein said amusement accessories attachment comprises at least one of a hanged ropes with knots or at least one of a hanged rope-ladders or at least one of hanged rings.

* * * * *